(12) United States Patent
Hirukawa

(10) Patent No.: US 9,158,378 B2
(45) Date of Patent: Oct. 13, 2015

(54) ELECTRONIC DEVICE AND CONTROL METHOD FOR ELECTRONIC DEVICE

(75) Inventor: Shigeki Hirukawa, Sagamihara (JP)

(73) Assignee: KYOCERA Corporation, Kyoto (JP)

( * ) Notice: Subject to any disclaimer, the term of this patent is extended or adjusted under 35 U.S.C. 154(b) by 117 days.

(21) Appl. No.: 13/984,802

(22) PCT Filed: Feb. 9, 2012

(86) PCT No.: PCT/JP2012/000881
§ 371 (c)(1),
(2), (4) Date: Aug. 9, 2013

(87) PCT Pub. No.: WO2012/108203
PCT Pub. Date: Aug. 16, 2012

(65) Prior Publication Data
US 2013/0321317 A1    Dec. 5, 2013

(30) Foreign Application Priority Data

Feb. 10, 2011    (JP) ................. 2011-026749

(51) Int. Cl.
G06F 3/045 (2006.01)
G06F 3/01 (2006.01)
G06F 3/044 (2006.01)
G06F 3/041 (2006.01)

(52) U.S. Cl.
CPC ............... *G06F 3/016* (2013.01); *G06F 3/044* (2013.01); *G06F 3/0414* (2013.01)

(58) Field of Classification Search
CPC ....... G06F 3/016; G06F 3/041; G06F 3/0414; G06F 3/044; G06F 3/045; G06F 3/01; G06F 3/048
USPC .............. 345/173–179; 178/18.01–18.07, 178/20.01–20.04
See application file for complete search history.

(56) References Cited

U.S. PATENT DOCUMENTS

| | | | |
|---|---|---|---|
| 7,683,889 B2 * | 3/2010 | Rimas Ribikauskas et al. | 345/173 |
| 7,952,566 B2 * | 5/2011 | Poupyrev et al. | 345/173 |
| 2001/0035854 A1 * | 11/2001 | Rosenberg et al. | 345/156 |
| 2004/0021643 A1 * | 2/2004 | Hoshino et al. | 345/173 |
| 2005/0259087 A1 * | 11/2005 | Hoshino et al. | 345/173 |

(Continued)

FOREIGN PATENT DOCUMENTS

| | | |
|---|---|---|
| JP | 2008-033739 A | 2/2008 |
| JP | 2009-025905 A | 2/2009 |

OTHER PUBLICATIONS

International Search Report; PCT/JP2012/000881.

(Continued)

*Primary Examiner* — Vijay Shankar
(74) *Attorney, Agent, or Firm* — Studebaker & Brackett PC

(57) ABSTRACT

An electronic device (10) according to the present invention is provided with a display unit (102) that displays an object with which a predetermined function is associated, a touch sensor (103), a tactile sensation providing unit (104) that provides a tactile sensation to a touch face of the touch sensor, and a control unit (106) that controls the tactile sensation providing unit (104) to provide a first tactile sensation when contact on a display surface of the object is detected and furthermore to execute the predetermined function associated with the object when data based on pressure of the contact satisfies a predetermined threshold, the electronic device thereby preventing an erroneous operation due to unintentional contact and allows for operation without confirmation of the screen display.

7 Claims, 5 Drawing Sheets

(56) References Cited

U.S. PATENT DOCUMENTS

| | | |
|---|---|---|
| 2006/0119586 A1* | 6/2006 | Grant et al. ............... 345/173 |
| 2006/0132457 A1* | 6/2006 | Rimas-Ribikauskas et al. ............... 345/173 |
| 2006/0146039 A1* | 7/2006 | Prados et al. ............... 345/173 |
| 2008/0024459 A1 | 1/2008 | Poupyreb et al. |

OTHER PUBLICATIONS

An Office Action; "Notice of Reason for Rejection," issued by the Japanese Patent Office on Apr. 1, 2014, which corresponds to Japanese Patent Application No. 2012-556799 and is related to U.S. Appl. No. 13/984,802; with English language concise explanation.

* cited by examiner

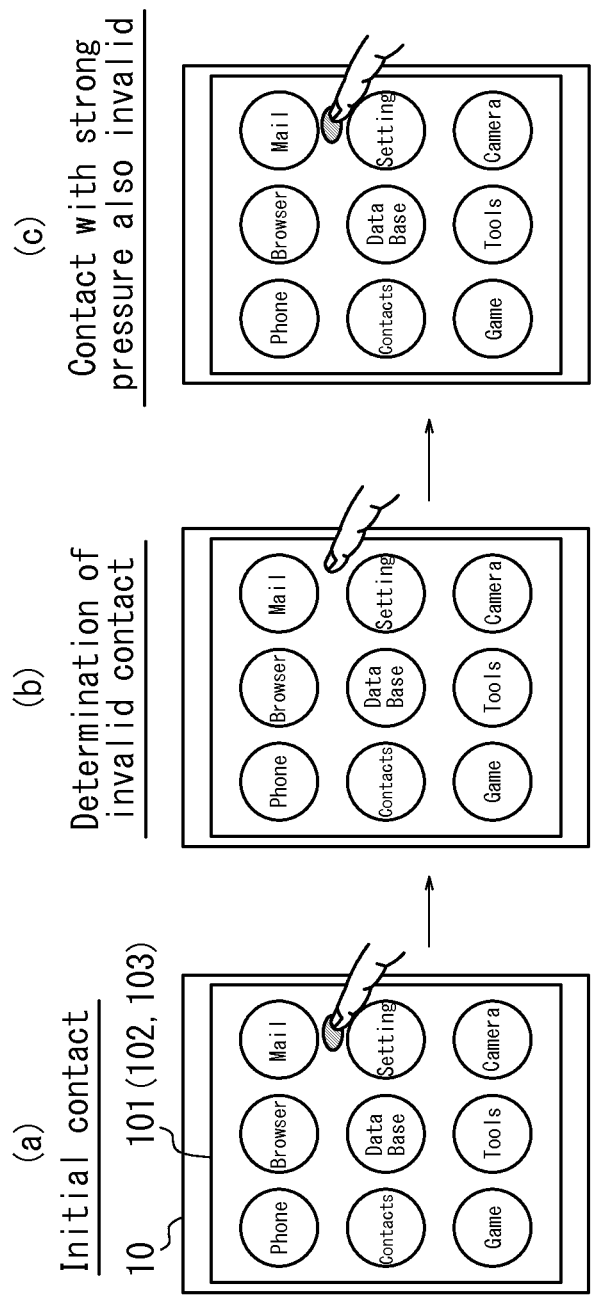

ELECTRONIC DEVICE AND CONTROL METHOD FOR ELECTRONIC DEVICE

CROSS-REFERENCE TO RELATED APPLICATION

This application claims priority to and the benefit of Japanese Patent Application No. 2011-26749 filed Feb. 10, 2011, the entire contents of which are incorporated herein by reference.

TECHNICAL FIELD

The present invention relates to an electronic device and a control method for the electronic device.

BACKGROUND ART

Easy-to-use electronic devices for the visually impaired, such as those with partial or total vision loss, are being studied. Among conventional electronic devices, techniques for facilitating operation by the visually impaired include, for example, providing unevenness on the housing and reading the content of an operation aloud. These approaches have drawbacks, however, in that the number of patterns that can be represented by unevenness on the housing is limited, and reading aloud is inconvenient in public places. For an electronic device displaying icons on the screen, a technique also exists to change the form of display of the icons in accordance with the past selection frequency of icons (for example, see Patent Literature 1).

CITATION LIST

Patent Literature 1: JP200925905A

SUMMARY

With the technique disclosed in Patent Literature 1, however, it is difficult for a visually impaired person to confirm the change in display form, and an erroneous operation caused by mistakenly contacting an icon unintentionally cannot be prevented.

Possible operations that can be set in order to prevent erroneous operation by the user include, for example, an operation to touch the same position rapidly (double-click), an operation to press another key while touching a target position, an operation to shake the electronic device (i.e. operate the body of the electronic device) while touching a target position, and an operation for a long press of a target position. Accurately touching the same position rapidly, however, is difficult for a visually impaired person. Performing another operation while touching a target position is also complex for the user and thus is unrealistic. Moreover, a long press requires that the screen be continuously pressed for a certain period of time and is thus a difficult operation to perform rapidly.

The present invention has been conceived in light of the above circumstances, and is to provide an electronic device that prevents an erroneous operation due to unintentional contact and allows for operation without confirmation of the screen display.

In order to achieve the above object, an electronic device according to a first aspect includes a display unit configured to display an object, a predetermined function being associated with the object; a touch sensor; a tactile sensation providing unit configured to provide a tactile sensation to a touch face of the touch sensor; and a control unit configured to control the tactile sensation providing unit to provide a first tactile sensation when contact on a display surface of the object is detected and furthermore to execute the predetermined function associated with the object when data based on pressure of the contact satisfies a predetermined threshold.

In an electronic device according to a second aspect, the display unit is further configured to display a plurality of objects, and the control unit sets the first tactile sensation for each object.

In an electronic device according to a third aspect, the control unit controls the tactile sensation providing unit to provide a second tactile sensation when the data based on the pressure of the contact to the object satisfies the predetermined threshold.

In an electronic device according to a fourth aspect, the control unit sets the predetermined threshold to be a value yielded by adding a predetermined value to data based on pressure at a start of the contact on the display surface of the object.

In an electronic device according to a fifth aspect, the control unit provides notification when the predetermined threshold exceeds a detection limit upon detection of the contact to the object.

In an electronic device according to a sixth aspect, the control unit sets the predetermined value for each object.

In an electronic device according to a seventh aspect, the control unit varies the predetermined value in accordance with an external condition.

While aspects of the present invention have been described above in terms of devices, the present invention may also be achieved by a method or a program substantially equivalent to the above devices, or by a storage medium having such a program recorded thereon. These aspects are also to be understood as included in the scope of the present invention.

For example, a method for controlling an electronic device according to an eighth aspect to achieve the present invention as a method is a method for controlling an electronic device that includes: a display unit configured to display an object, a predetermined function being associated with the object; a touch sensor; and a tactile sensation providing unit configured to provide a tactile sensation to a touch face of the touch sensor, the control method including the steps of: controlling the tactile sensation providing unit to provide a first tactile sensation when contact on a display surface of the object is detected, and furthermore executing the predetermined function associated with the object when data based on pressure of the contact satisfies a predetermined threshold.

According to the electronic device and method for controlling an electronic device of the present invention, it is possible to provide an electronic device that prevents an erroneous operation due to unintentional contact and allows for operation without confirmation of the screen display.

BRIEF DESCRIPTION OF DRAWINGS

The present invention will be further described below with reference to the accompanying drawings, wherein:

FIGS. 5A-5C illustrate an example of operations by the mobile terminal according to the embodiment of the present invention.

DESCRIPTION OF EMBODIMENTS

With reference to the drawings, the following describes an embodiment of the present invention in detail. In the following embodiment, an example of an electronic device according to the present invention is assumed to be a mobile terminal such as a mobile phone or a PDA and to be provided with a touch panel. An electronic device according to the present invention, however, is not limited to such terminals and may, for example, be any of a variety of electronic devices including a game device, a digital camera, a portable audio player, a laptop computer, a mini laptop computer, and the like.

Figure 1:
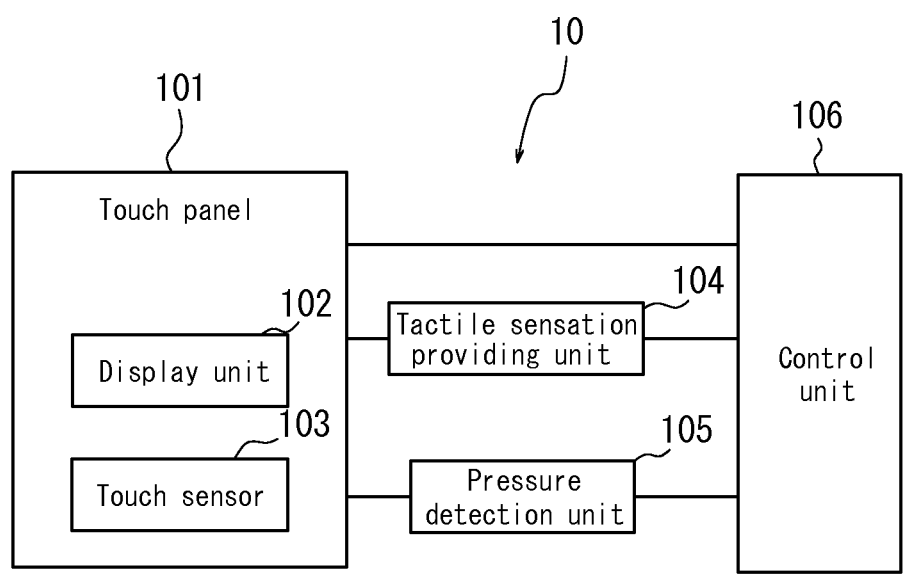
FIG. 1 is a functional block diagram of a mobile terminal according to an embodiment of the present invention.

FIG. 1 is a functional block diagram schematically illustrating the internal configuration of a mobile terminal 10 according to an embodiment of the present invention. As illustrated in FIG. 1, the mobile terminal 10 is provided with a touch panel 101, a tactile sensation providing unit 104, a pressure detection unit 105, and a control unit 106.

In the present embodiment, the touch panel 101 is provided with a display unit 102 and a touch sensor 103. The touch panel 101 is configured to have the touch sensor 103, which detects contact by the user, overlaid on the front of the display unit 102. The present embodiment includes the case of forming the touch sensor 103 on the front of the display unit 102 with a supporting member therebetween.

The display unit 102 of the touch panel 101 is, for example, configured using a liquid crystal display (LCD), an organic EL display, or the like. The display unit 102 displays an object with which a predetermined function is associated. An object is the target of an input operation by the user and is an icon for launching an application, a menu or button included in the Graphical User Interface (GUI) of an application, or the like. The touch sensor 103, which detects contact on a touch face by the user's finger or the like, is arranged on the front of the display unit 102. The touch sensor 103 is configured using a well-known type, such as a resistive film type, a capacitive type, an optical type, or the like. Upon detecting contact by the user's finger or the like, the touch sensor 103 provides information on the contact position to the control unit 106. Note that in order for the touch sensor 103 to detect contact, it is not essential for the user's finger or the like to physically contact the touch sensor 103. For example, if the touch sensor 103 is an optical type, the touch sensor 103 detects the position at which an infrared ray is blocked by a finger or the like and can therefore detect contact even in the absence of physical contact.

The tactile sensation providing unit 104 transmits a vibration to the touch face of the touch sensor 103 and is, for example, configured using a piezoelectric element, an ultrasonic transducer, or the like. By vibrating, the tactile sensation providing unit 104 can provide a tactile sensation to a user's finger or the like in contact with the touch sensor 103. Furthermore, the tactile sensation providing unit 104 can be configured to vibrate the touch face of the touch sensor 103 indirectly by causing the mobile terminal 10 to vibrate via a vibration motor (eccentric motor). The tactile sensation provided by the tactile sensation providing unit 104 is specified by factors such as the type of vibration (frequency, phase, vibration interval, number of vibrations, and the like) and the intensity of vibration (amplitude and the like).

The pressure detection unit 105 detects pressure on the touch face of the touch sensor 103 and is, for example, configured using a piezoelectric element, a strain gauge sensor, or the like. The pressure detection unit 105 provides the control unit 106 with data based on the detected pressure. Data based on pressure refers, for example, to the load (N) of the pressure, the voltage (V) or power (W) generated by the piezoelectric element due to pressure, the resistance ($\Omega$) of a strain gauge sensor that varies with pressure, data related to these values, or the like. Note that when, for example, the tactile sensation providing unit 104 and pressure detection unit 105 are both configured with a piezoelectric element, the tactile sensation providing unit 104 and the pressure detection unit 105 may be configured integrally by a shared piezoelectric element. This is because a piezoelectric element has the property of generating power when pressure is applied and of deforming upon application of power. When thus adopting an integrated configuration with a piezoelectric element, the touch sensor 103 may be held by elastic members formed at the four corners of the display unit 102, and a piezoelectric element may be attached to a side of the bottom face of the touch sensor 103.

The control unit 106 controls and manages the entire mobile terminal 10, starting with the functional units thereof, and is configured using a suitable processor such as a CPU. In particular, the control unit 106 controls the tactile sensation providing unit 104 to provide a predetermined tactile sensation (first tactile sensation) when contact to an object displayed on the display unit 102 is detected and also subsequently executes a predetermined function associated with the object when data based on pressure of the contact to the object satisfies a predetermined threshold. In other words, the control unit 106 considers the initial contact to an object to be an inquiry from the user and notifies the user of information on the contact position (for example, whether an icon is present and the type thereof) by providing a tactile sensation. Subsequently, when the user confirms the tactile sensation and then performs contact with stronger pressure, the control unit 106 judges that the user has performed a selection operation on the object and executes a predetermined function (for example, launching an application) associated with the selected object.

When the user performs initial contact, the control unit 106 can first provide notification of whether an icon is present via a tactile sensation. For example, the control unit 106 provides the user with a tactile sensation when an object is contacted and does not provide a tactile sensation when any other region is contacted (or provides a tactile sensation indicating that no object is present). The control unit 106 can thus convey information on the contact position to the user. Furthermore, when the user contacts the display surface of an object, the control unit 106 can notify the user of the type of the object via a tactile sensation. For example, when a tactile sensation is set for each object, the control unit 106 can convey more specific information on the contact position (for example, the type of icon) to the user by providing the user with a tactile sensation corresponding to the object displayed at the contacted position.

After providing a tactile sensation for the initial contact by the user, the control unit 106 can dynamically set a threshold for object selection by the user (selection threshold). For example, the control unit 106 can set the selection threshold to be a value yielded by adding a value $\Delta$ to data based on the pressure when the tactile sensation was provided for the contact. The control unit 106 can also set the value $\Delta$ for each object. For example, the value $\Delta$ may be set to be small for the icon of a frequently used application and set to be large for an infrequently used application. It thus becomes easier to execute a frequently used application. When the value yielded by adding the value Δ to data based on the pressure when the tactile sensation was provided for the contact exceeds the detection limit of the pressure detection unit 105, the control unit 106 can also notify the user accordingly. This notification includes, for example, notification via a tactile sensation (error tactile sensation) using the tactile sensation providing unit 104 and notification via sound using a non-illustrated speaker.

When the user confirms information on the contact position via a tactile sensation and then performs contact with stronger pressure, the control unit 106 can execute the function associated with the object and furthermore control the tactile sensation providing unit 104 to provide a predetermined tactile sensation (second tactile sensation). The first tactile sensation for notification of information on the contact position and the second tactile sensation indicating that the function associated with the object has been executed may be the same tactile sensation or different tactile sensations. Furthermore, as the second tactile sensation, a different tactile sensation can be set in accordance with the type of object.

Figure 2:
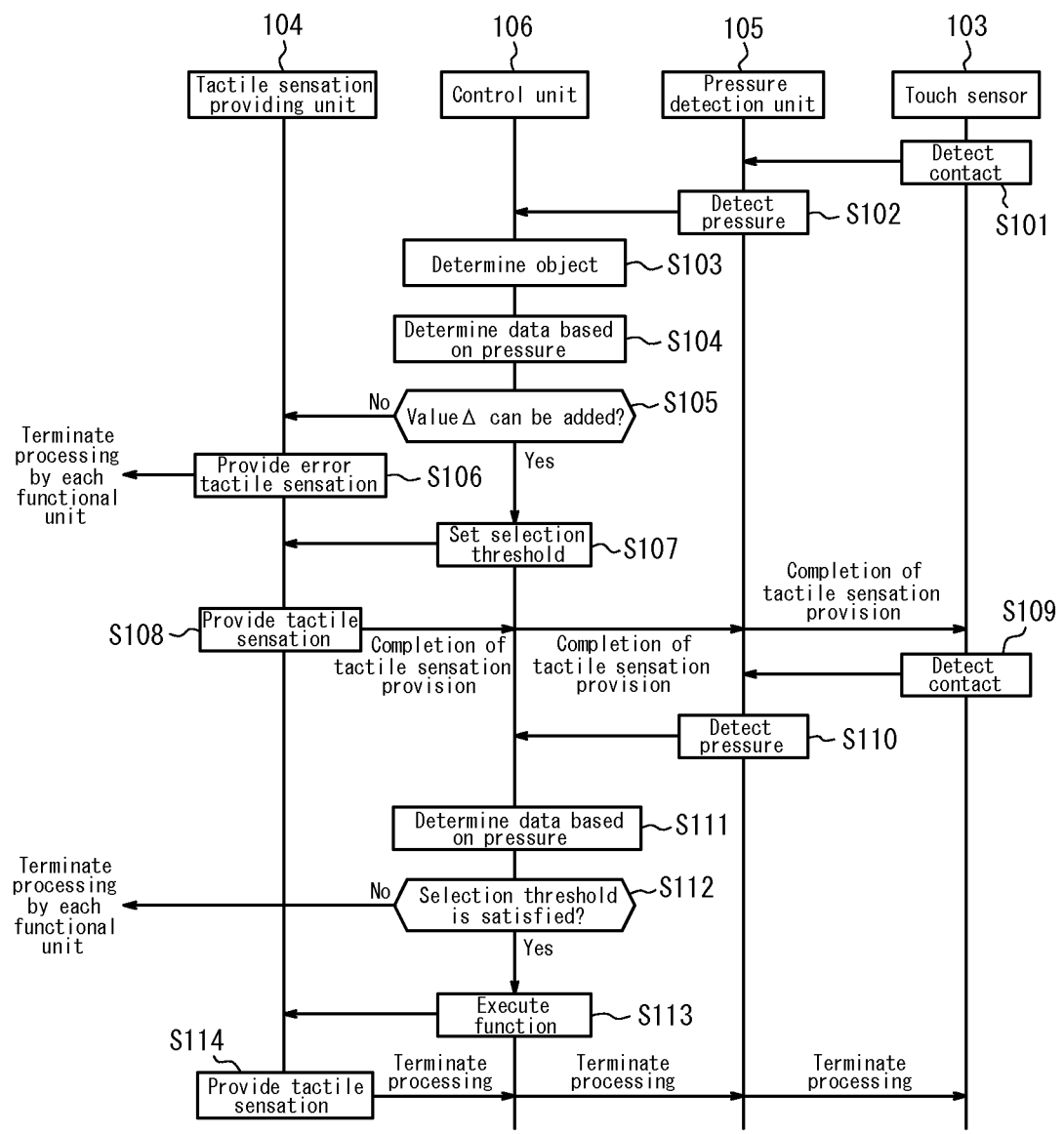
FIG. 2 illustrates an operation sequence of the mobile terminal in FIG. 1.
Figure 3:
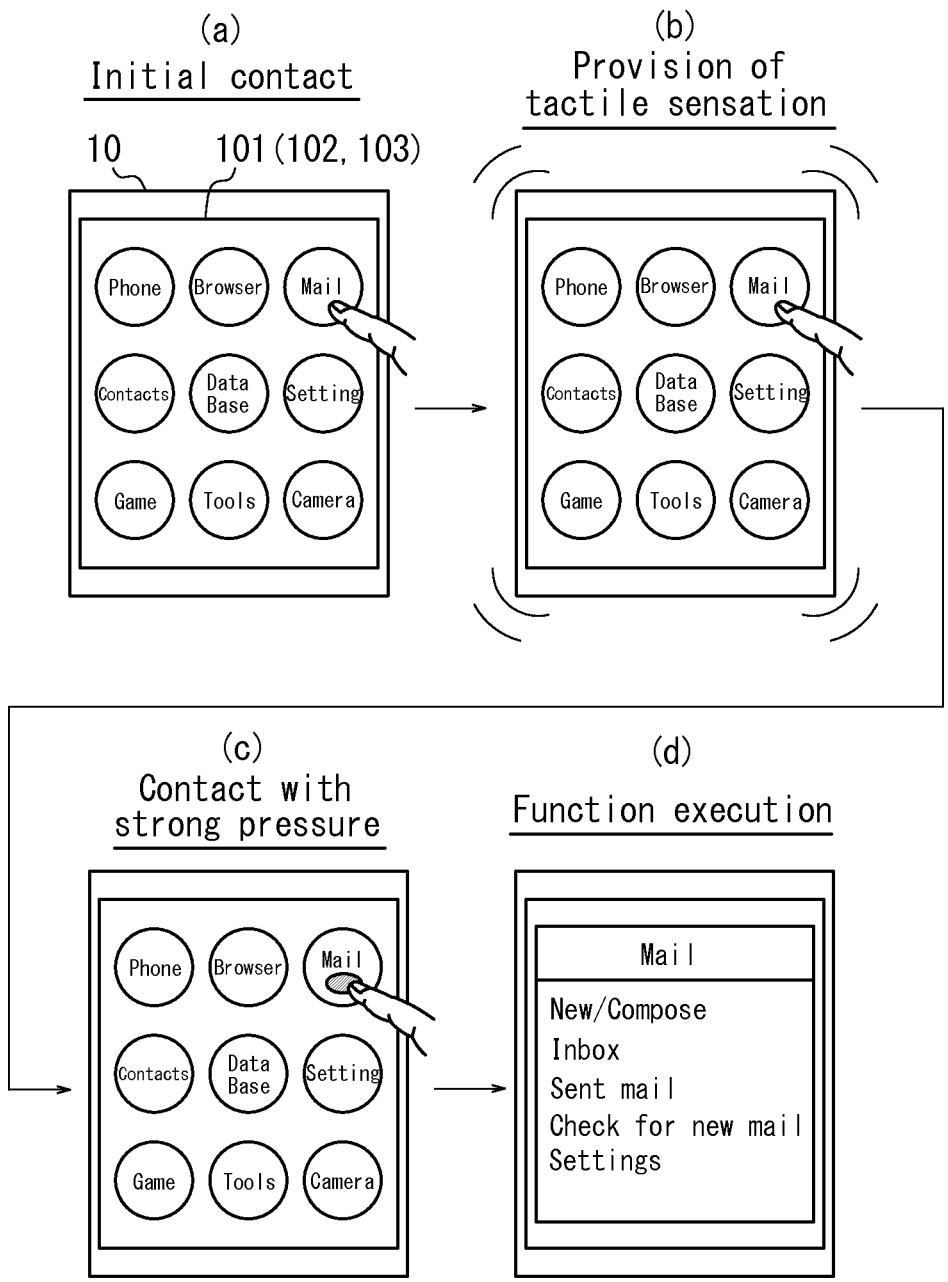
FIGS. 3A-3D illustrate an example of operations by the mobile terminal according to the embodiment of the present invention.

FIG. 2 illustrates an operation sequence of the mobile terminal 10. First, upon the touch sensor 103 detecting contact from the user (step S101), the pressure detection unit 105 detects pressure of the contact (step S102). The control unit 106 determines, from the position information of the contact, the object displayed at the contacted position (step S103). Next, the control unit 106 determines data based on the pressure detected by the pressure detection unit 105 (step S104).

The control unit 106 determines whether a value Δ can be added to the data based on the pressure detected by the pressure detection unit 105 (step S105). When the value Δ cannot be added, the control unit 106 controls the tactile sensation providing unit 104 to provide an error tactile sensation to the user (step S106). Note that not being able to add the value Δ refers, for example, to the pressure at the time of initial contact being too strong, so that the value yielded by adding the value Δ to the data based on the pressure detected by the pressure detection unit 105 exceeds the detection limit of the pressure detection unit 105. After providing the error tactile sensation, the control unit 106 terminates processing by each functional unit.

When the value Δ can be added in step S105, the control unit 106 sets the selection threshold for selecting an object (step S107). For example, the control unit 106 can set the selection threshold to be a value yielded by adding the value Δ to the data based on the pressure detected by the pressure detection unit 105. Next, the control unit 106 controls the tactile sensation providing unit 104 to provide a predetermined tactile sensation to the user (step S108). For example, the control unit 106 can provide a tactile sensation in accordance with the object displayed at the contacted position. In other words, the control unit 106 can notify the user, via vibration, of information on the user's contact position. After provision of the tactile sensation, each functional unit is notified of completion of tactile sensation provision.

Once the user confirms the tactile sensation provided in step S108 and then performs contact with stronger pressure, the touch sensor 103 detects the contact (step S109), and the pressure detection unit 105 detects pressure of the contact (step S110). The control unit 106 determines data based on the pressure detected by the pressure detection unit 105 (step S111) and determines whether the data based on the pressure satisfies the selection threshold set in step S107 (step S112).

When the data based on the pressure satisfies the selection threshold, the control unit 106 executes the predetermined function associated with the object (step S113). Next, the control unit 106 controls the tactile sensation providing unit 104 to provide a predetermined tactile sensation to the user (step S114). After provision of the tactile sensation, each functional unit is notified of termination of processing. Note that when the data based on the pressure in step S112 does not satisfy the selection threshold, the control unit 106 terminates processing by each functional unit. Further note that although the selection threshold in step S107 is a value yielded by adding a predetermined value Δ to the data based on the pressure at the time of contact, the present embodiment is not limited in this way, and for example a predetermined value (such as 2 N) alone may be used as the predetermined threshold.

FIGS. 3A through 3D illustrate an example of operations by the mobile terminal 10. When the user's finger contacts the icon of a mail application displayed on the display unit 102, as in FIG. 3A, the mobile terminal 10 executes processing to provide the finger with a tactile sensation, as in FIG. 3B. In other words, the mobile terminal 10 judges that the initial contact on the touch sensor 103 by the user is an inquiry from the user and notifies the user of information on the contact position (for example, of the existence of the mail application icon) via vibration. By conveying information on the contact position to the user via vibration, the mobile terminal 10 can provide the user with operation assistance without recurring to unevenness or sound. Next, upon the user contacting the display surface displaying the mail application icon with a strong pressure, as in FIG. 3C, a function associated with the icon displayed on the contacted display surface is executed (for example, launching of the mail application), as in FIG. 3D. In other words, after provision of the tactile sensation, the mobile terminal 10 judges that the user has selected the icon at the contacted position when the user further performs a strong pressing operation on the icon. In this way, the user can confirm the icon at the initially contacted position and then accurately select the icon.

Figure 4:
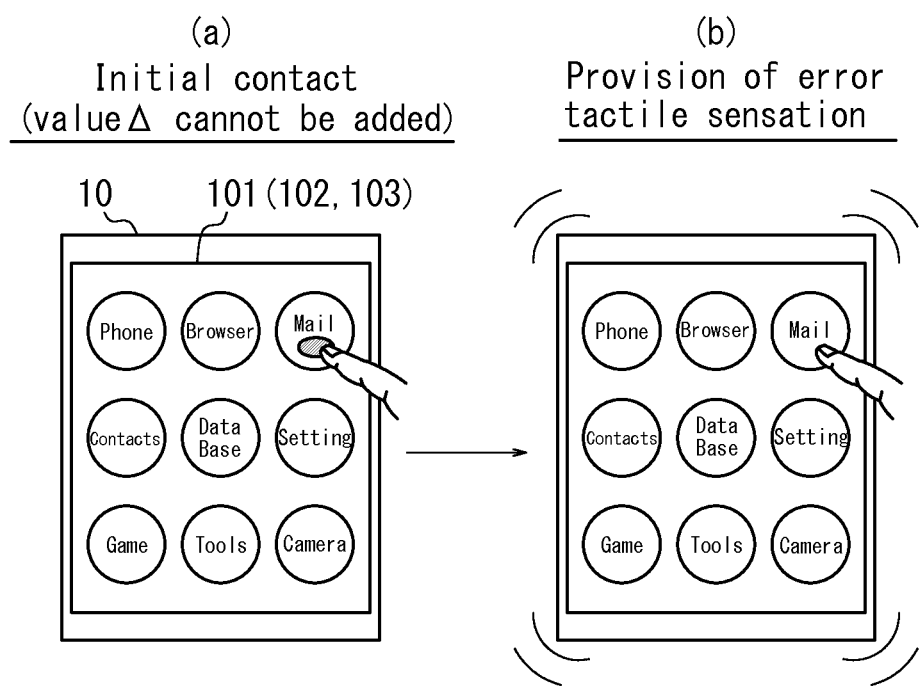
FIGS. 4A and 4B illustrate an example of operations by the mobile terminal according to the embodiment of the present invention.

FIGS. 4A and 4B illustrate an example of providing an error tactile sensation when the initial contact is too strong. When the pressure of the initial contact is too strong and the value yielded by adding the value Δ to the pressure detected by the pressure detection unit 105 exceeds the detection limit of the pressure detection unit 105, as in FIG. 4A, the mobile terminal 10 provides the user with an error tactile sensation, as in FIG. 4B.

FIGS. 5A through 5C illustrates an example of processing when a region other than an object is contacted. Upon contact to a region other than an object, as in FIG. 5A, the mobile terminal 10 determines that the contact is invalid (FIG. 5B) and does not execute a predetermined function even for contact with a strong pressure (FIG. 5C).

In this way, with the present embodiment, the control unit 106 controls the tactile sensation providing unit 104 to provide a predetermined tactile sensation (first tactile sensation) when contact to an object is detected and also subsequently executes a predetermined function associated with the object when data based on pressure of the contact on a display surface displaying the object reaches a selection threshold. The user can thus prevent an erroneous operation due to unintentional contact and can operate the electronic device without confirming the screen display. In other words, the operability of the mobile terminal can be improved for the visually impaired, such as those with partial or total vision loss, even in public places where it is inconvenient to produce sound.

According to the present embodiment, the predetermined tactile sensation provided when contact is detected on the display surface displaying an object can also be set for each object. In this way, the user can confirm the object displayed on the contacted display surface without looking at the screen display. Setting a specific tactile sensation for a frequently used object can also improve user convenience. Moreover, setting a specific tactile sensation for an object that serves as a base point for contact, such as a home position key of the keyboard, allows the user to confirm the contact position without looking at the screen display.

According to the present embodiment, when the pressure of contact on the display surface displaying an object reaches the selection threshold, the control unit 106 can also control the tactile sensation providing unit 104 to provide a predetermined tactile sensation (second tactile sensation). In this way, the user can be notified that the function associated with the object has been executed, and the user can confirm that the selection operation has been performed normally without looking at the screen display.

According to the present embodiment, the control unit 106 can also set the selection threshold to be a value yielded by adding a value Δ to the pressure at the start of contact on the display surface displaying the object. In this way, the value can be kept fixed between the contact for the initial inquiry and the subsequent contact for selection, and regardless of the degree of pressure at the time of initial contact, the user can perform a selection operation by further applying a fixed pressure.

According to the present embodiment, the control unit 106 can also provide notification when the selection threshold at the time that contact to the object was detected exceeds the detection limit of the pressure detection unit 105. In this way, in cases such as when the initial contact is too strong, the user can be notified of an error.

According to the present embodiment, the control unit 106 can also set the value Δ for each object. In this way, by for example setting the value Δ to be small for a frequently used application, the user can smoothly perform a selection operation with a small force after confirming, via the tactile sensation, information on the contact position.

Although the present invention has been described by way of an embodiment with reference to the accompanying drawings, it is to be noted that various changes and modifications will be apparent to those skilled in the art. Therefore, such changes and modifications are to be understood as included within the scope of the present invention. For example, the functions and the like included in the units, steps, and the like may be reordered in any logically consistent way. Furthermore, functional units, steps, and the like may be combined into one or divided.

For example, the control unit may vary the predetermined value Δ in accordance with an external condition. The strength of a touch may change in accordance with conditions of use. For example, during use in an unstable location, such as on a train, the touch panel may unexpectedly be pressed strongly. Therefore, the mobile terminal may, for example, be provided with an acceleration sensor, and when the acceleration sensor detects acceleration equal to or greater than a predetermined threshold, the control unit can set the predetermined value Δ to be a high value. An erroneous operation by the user can thus be prevented even in unstable conditions such as when riding on a train. Note that apart from an acceleration sensor, the mobile terminal can acquire external conditions using a vibration sensor or a position information sensor such as GPS. In other words, a mobile phone can set the predetermined value Δ to be high in cases such as when vibration is large or when travel speed is high. Conversely, the mobile phone can consider the external environment to be stable and set the predetermined value Δ to be low in cases such as when acceleration is low, vibration is small, or travel speed is low. In this way, in stable conditions, the user can perform a selection operation with a small force after confirming, via the tactile sensation, information on the contact position.

As the tactile sensation for notifying the user of information on the contact position, a particular vibration pattern may be set in advance for each user or for each function of an object. Other possible methods include providing notification of the object content by a combination of individual vibrations, as with Morse code.

With regard to notification of information on the contact position, a difficulty may occur when vibration replaces the conventional technique of reading aloud, since if notification is to be provided for too many matters, the user may not be able to remember all of the vibration patterns. Accordingly, the difficulty the user has in remembering all of the vibration patterns may be resolved by categorizing the vibration patterns. For example, the menu option "new" (or "compose") appears in a variety of applications, such as mail, address book, notepad, and the like. In this case, the number of vibration patterns the user needs to remember can be reduced by setting the same tactile sensation pattern for the "new" menu option in every application.

The display unit and the touch sensor of the above embodiment may be configured as an integrated device by, for example, providing a common substrate with both functions. An example of a device thus integrating the functions of both the display unit and the touch sensor is a liquid crystal panel having a matrix of pixel electrodes, with a plurality of photoelectric conversion elements, such as photodiodes, regularly mixed therein. This device is contacted by a pen at a desired position on the panel display, and while displaying images with the liquid crystal panel structure, the device can detect the contact position by light from a backlight for liquid crystal display being reflected by the tip of the pen and received by surrounding photoelectric conversion elements.

The control unit in the above embodiment executes a predetermined function associated with an object when data based on pressure detected by the pressure detection unit satisfies a predetermined threshold. In this case, the data based on pressure detected by the pressure detection unit satisfying a predetermined threshold may refer to the data based on pressure detected by the pressure detection unit reaching a predetermined value, to the data based on pressure detected by the pressure detection unit exceeding a predetermined value, or to the pressure detection unit detecting a predetermined value.

In the above explanation, the technical meaning of expressions such as, for example, a predetermined value "or more" and a predetermined value "or less" is not necessarily precise. In accordance with the specifications of the mobile terminal, these expressions encompass the cases both of including and of not including the value representing the standard. For example, a predetermined value "or more" may refer not only to the case of an increasing value reaching the predetermined value, but also the case of exceeding the predetermined value. Furthermore, a predetermined value "or less", for example, may refer not only to the case of a decreasing value reaching the predetermined value, but also the case of falling below the predetermined value, i.e. of being less than the predetermined value.

REFERENCE SIGNS LIST

10: Mobile terminal
101: Touch panel
102: Display unit
103: Touch sensor
104: Tactile sensation providing unit
105: Pressure detection unit
106: Control unit

The invention claimed is:

1. An electronic device comprising:
   a display unit configured to display an object, a predetermined function being associated with the object;
   a touch sensor;
   a tactile sensation providing unit configured to provide a tactile sensation to a touch face of the touch sensor; and
   a control unit configured to control the tactile sensation providing unit to provide a first tactile sensation when contact to the object is detected and furthermore to execute the predetermined function associated with the object when data based on pressure of the contact satisfies a predetermined threshold, wherein
   the control unit sets the predetermined threshold to be a value yielded by adding a predetermined value to data based on pressure at a start of the contact on the display surface of the object.

2. The electronic device according to claim 1, wherein the display unit is further configured to display a plurality of objects, and the control unit sets the first tactile sensation for each object.

3. The electronic device according to claim 1, wherein the control unit controls the tactile sensation providing unit to provide a second tactile sensation when the data based on the pressure of the contact to the object satisfies the predetermined threshold.

4. The electronic device according to claim 1, wherein the control unit provides notification when the predetermined threshold exceeds a detection limit upon detection of the contact to the object.

5. The electronic device according to claim 1, wherein the control unit sets the predetermined value for each object.

6. The electronic device according to claim 1, wherein the control unit varies the predetermined value in accordance with an external condition.

7. A method for controlling an electronic device comprising the steps of:
   controlling a tactile sensation providing unit to provide a first tactile sensation when contact to an object displayed is detected; and
   executing a predetermined function associated with the object when data based on pressure of the contact satisfies a predetermined threshold, wherein
   the predetermined threshold is set to be a value yielded by adding a predetermined value to data based on pressure at a start of the contact on a display surface of the object.

* * * * *